Dec. 26, 1939.   J. H. THOMAS   2,184,326
TIRE
Filed July 22, 1936
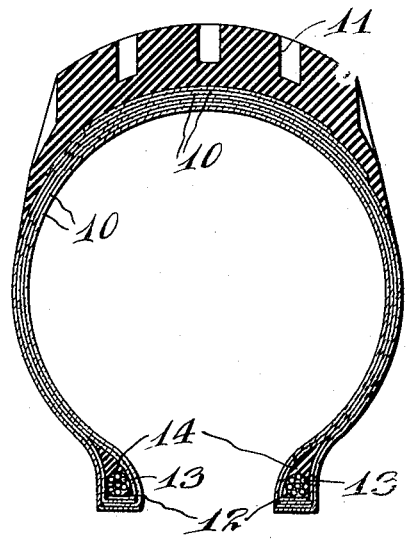
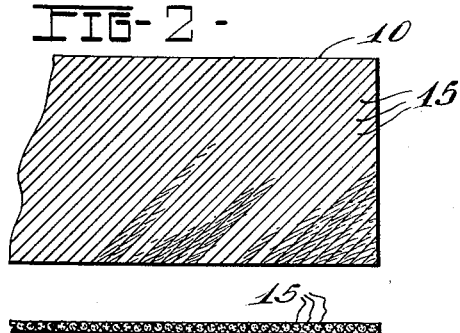
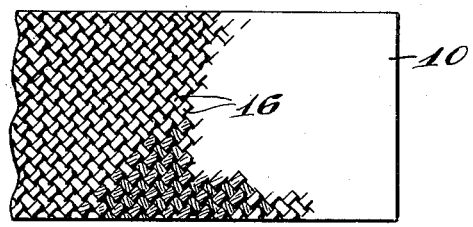
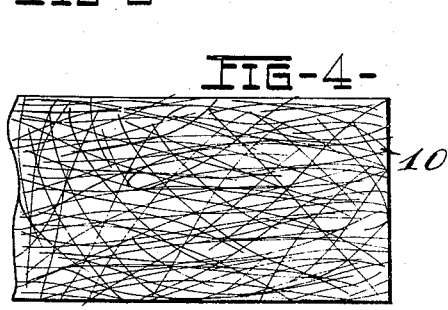
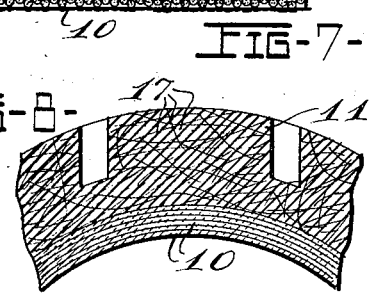
INVENTOR.
J. H. Thomas.
BY Rule & Hoge
ATTORNEYS.

Patented Dec. 26, 1939

2,184,326

UNITED STATES PATENT OFFICE 2,184,326

TIRE

John H. Thomas, Newark, Ohio, assignor, by mesne assignments, to Owens-Corning Fiberglas Corporation, a corporation of Delaware Application July 22, 1936, Serial No. 91,891

4 Claims. (Cl. 152—355)

The present invention relates to tires such as rubber automobile tires or the like, and more particularly to an improved tire having a reenforcement of fine glass fibers.

Heretofore in the automobile tire art, it has been customary to provide carcasses made of cotton or other organic fibrous material. These, however, had several disadvantages in that the organic fibers tended to rot and become weak causing their early disintegration and loss of strength. Particularly at high speeds and in warm weather the temperature of the tire increased to the point where the cotton cord became relatively weak. These high temperatures added to the natural inclination of the cotton to decompose and weaken. Even at low temperatures, the cotton or other organic fibers had the tendency to rot, especially if moisture was present and this rotting was accelerated by the mutual friction of the individual fibers one upon another which permitted the infiltration of moisture.

It is an object of the present invention to avoid these shortcomings and to provide a carcass and reenforcement for a tire which will not be affected by high temperatures or moisture.

It is another object of the present invention to provide for a tire, reenforcement which is exceedingly strong and will not break down under heavy loads.

A further object of the present invention is to provide a reenforcement of glass threads composed of a multiplicity of exceedingly fine fibers which we have found to possess an extremely high tensile strength and at the same time a flexibility and stretchability far beyond that heretofore known and contemplated for glass fibers.

It is another object of the present invention to provide a reenforcement for the rubber treads in a tire which will not only add strength to the tread, but also increase the wearing qualities and the nonskid properties of the tread.

Other objects and advantages of the present invention will become apparent from the following description taken in conjunction with the accompanying drawing, in which:

Fig. 1 is a cross sectional view of an automobile tire having a conventional design, but which is reenforced and constructed in accordance with the present invention;

Fig. 2 is a diagrammatic plan view of a layer of cords made in accordance with the present invention;

Fig. 3 is a sectional view of the cords and fabric shown in Fig. 2;

Fig. 4 is a diagrammatic plan view of a fabric composed of fine matted glass fibers which may be incorporated as a reenforcing medium in my improved tire;

Fig. 5 is a side view of the matted mass shown in Fig. 4;

Fig. 6 is a plan view illustrating a woven fabric of glass fibers which may be incorporated as a reenforcing medium to the tire;

Fig. 7 is a side sectional view of the fabric shown in Fig. 6; and

Fig. 8 is a fragmentary sectional view of the upper portion of the tire showing the reenforcement of the tread made in accordance with the present invention.

I have found that the type of glass fiber which is to be incorporated successfully in automobile tires is substantially continuous in length and exceedingly fine, ranging in diameters of not more than a few microns and preferably less than five microns in diameter. Glass fibers having fine diameters of this order are not only exceedingly strong, having a tensile strength of a million or more pounds per square inch, but they are also exceedingly flexible and will also withstand a certain degree of stretching which is not present in heavier fibers. These properties I have found to be extremely important in automobile tires which are subjected to a high degree of flexing and sudden application of loads. A further requisite which I have found to be important in the incorporation of fine glass fibers into an automobile tire, is the protection of each individual fiber from adjacent fibers, to the end that the individual fibers are not permitted to scratch and mutilate each other as the tire is flexed and bent. In order to realize this condition I have found it advisable to add to the individual fibers, a protective coating of a plastic substance which may be of a variety of forms.

The coatings of the glass fibers are preferably rubber, which may be applied during or immediately after the manufacture of the glass fibers themselves or at any other convenient period. The rubber surrounds and forms a coating for the fibers, particularly at the intersection or juxtaposed surfaces of adjacent fibers, whereby the fibers are separated one from another and are thus prevented from scratching or mutilating each other. The glass fibers may also be coated with other plastic materials such as oils, waxes, resins, cellulose products, etc.

The long fine glass fibers which are preferably substantially continuous in length, may be formed into threads and these threads twisted into cords of a size conventional for automobile tires or the like. Not only the individual fibers, but also the individual threads making up the cords may be impregnated with rubber or latex compounds or plastics as mentioned hereinabove.

Referring now more particularly to the drawing, reference character 10 designates a fabric or ply built up of my proposed fine glass fibers. In Fig. 1 a four ply fabric is illustrated for the side walls of the tire and a six ply fabric is shown along the upper edge to reenforce the treads 11. Beads 12 around the inner margin of the tire may be provided with individual strands 13 embedded in a rubber core 14 to give strength and permanence to the tire. Figs. 2 and 3 illustrate in a general way a single layer of fabric formed of a plurality of individual cords 15 laid parallel with one another to form one of the plies illustrated. In Fig. 1 the individual cords as they are laid side by side, are impregnated with a rubber compound to maintain the individual cords separate and apart to the end that internal friction and abrasion is minimized. A layer of these cords is preferably laid in a diagonal direction around the tire and the adjacent layers of cords are preferably laid in the transversely diagonal direction crossing the first mentioned layer. In this manner the completed tire will be built up of alternate layers of cords running in transversely diagonal directions.

Figs. 4 and 5 illustrate in a general way a thin mat of long fine fibers which are thoroughly impregnated with a rubber compound. The rubber seems to adhere to the fibers, and in particular at the places where the individual fibers cross each other, thus separating them and protecting them one from the other. A thin mat of glass having a relatively large percentage of rubber, preferably in the neighborhood of about fifty to seventy-five percent rubber, may be incorporated into the tire as one of the layers or plies for the carcass. If desired mats of this character may be used in conjunction with the corded fabric illustrated in Figs. 2 and 3, or with the other embodiments of the invention.

Figs. 6 and 7 illustrate a further embodiment of the invention in which the threads or strands 16, each of which may comprise a multiplicity of fine continuous glass fibers, are woven into a fabric to form the individual plies 10 of the tire. Woven fabrics of this type are also preferably embedded in a matrix of rubber or the like.

In Fig. 8 a modified form of the present invention is disclosed in which the tread of the tire is provided with a plurality of long fine glass fibers 17 in such a manner that the individual fibers provide strength and permanence to the tire and at the same time increase the nonskid properties of the tread. As the tread wears down the individual fine glass fibers are exposed at the surface and increase the frictional properties of the tire. Owing to the fineness of the fibers, however, it will be noted that they are prevented from working their way into the tire or otherwise being dislodged from their position.

As a further modification of the present invention, it is possible to combine the conventional fibers, such as cotton, or the like, which are now in vogue with glass fibers and thereby combine the beneficial characteristics of the glass, particularly strength and durability, with that of the cotton fibers. In fabricating this embodiment, it is possible to provide alternate layers, or plies 10, of cotton cord and glass cord, or it is possible to form the individual cords with twisted fibers of glass and cotton. Fabrics such as shown in Fig. 6, may also be built up of organic and glass fibers, as well as other suitable combinations with glass fibers.

Modifications may be resorted to within the spirit and scope of the appended claims.

I claim:

1. A tire for an automobile or the like having a fabric reenforcing said tire which comprises interwoven threads, each said thread comprising a multiplicity of glass fibers, a plastic substance coating said fibers individually, and an impregnation of rubber throughout said threads.

2. An automobile tire or the like having a fabric reenforcing said tire which comprises interwoven threads of glass fibers, a coating of plastic substance over said fibers, and an impregnation of rubber throughout said threads, said fibers being substantially continuous in length and having diameters less than about five microns.

3. A tire for an automobile or the like having a fabric reenforcing said tire which comprises interwoven threads, each said thread comprising a multiplicity of fine glass fibers, a plastic substance chosen from the group consisting of oils, waxes, resins, and cellulose products, coating said fibers individually, and an impregnation of rubber throughout said threads.

4. A tire for an automobile or the like having a fabric reenforcing said tire which comprises thin interwoven threads, each said thread comprising a multiplicity of fine glass fibers, a plastic substance chosen from the group consisting of oils, waxes, resins, and cellulose products, coating said fibers individually, and an impregnation of rubber throughout said threads, said fibers being substantially continuous in length and having diameters not more than about five microns.

JOHN H. THOMAS.